May 7, 1968
R. A. STUBBLEFIELD
3,381,952
LOAD-LEVELING SHOCK ABSORBER
Filed Oct. 23, 1965
4 Sheets-Sheet 1
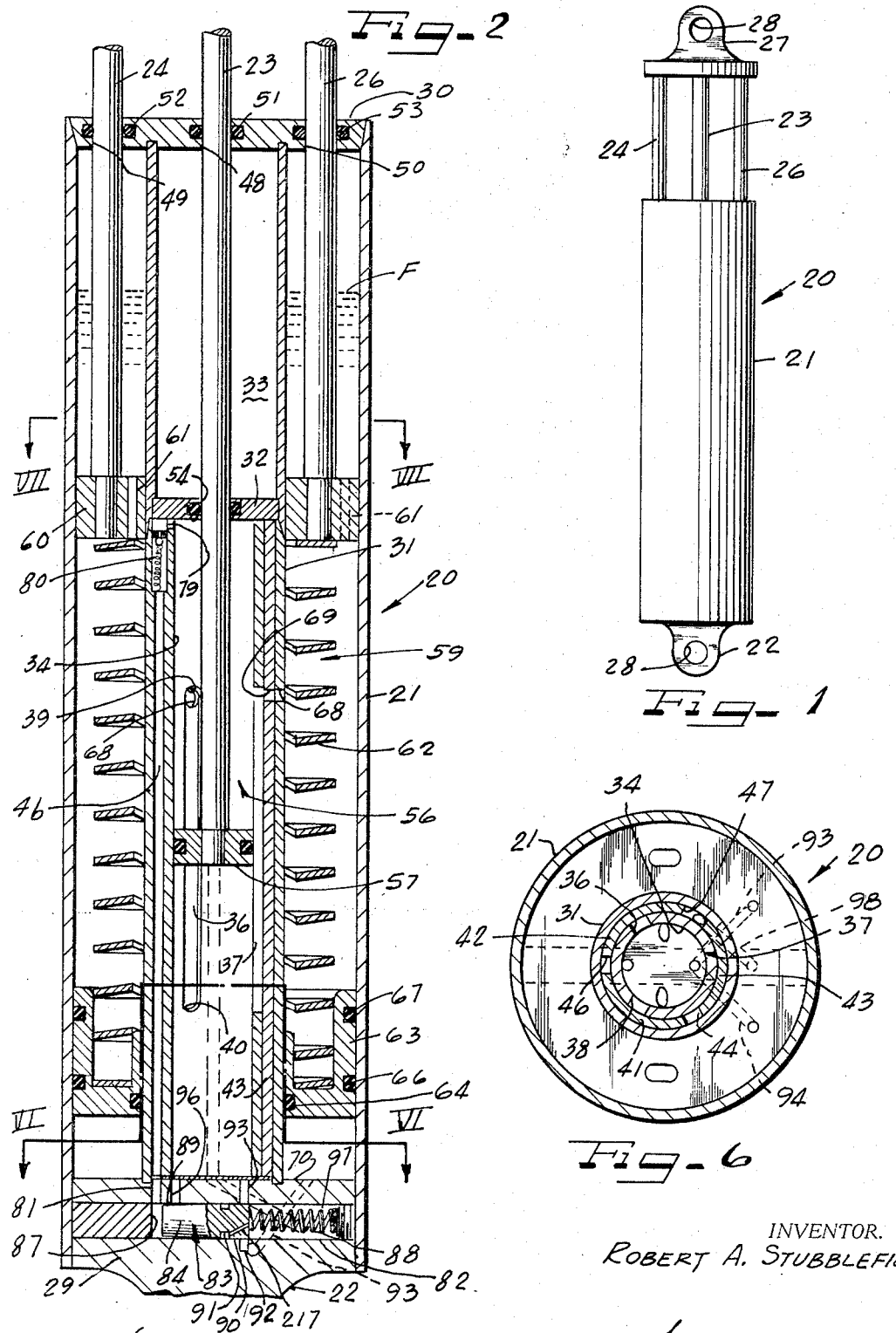
INVENTOR.
ROBERT A. STUBBLEFIELD
BY *Hill, Sherman, Meroni, Gross & Simpson* ATTORNEYS May 7, 1968  R. A. STUBBLEFIELD  3,381,952
LOAD-LEVELING SHOCK ABSORBER
Filed Oct. 23, 1965  4 Sheets-Sheet 2
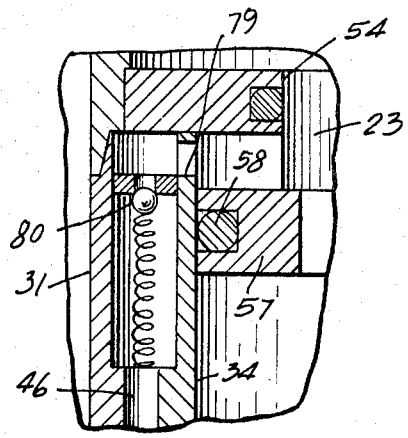
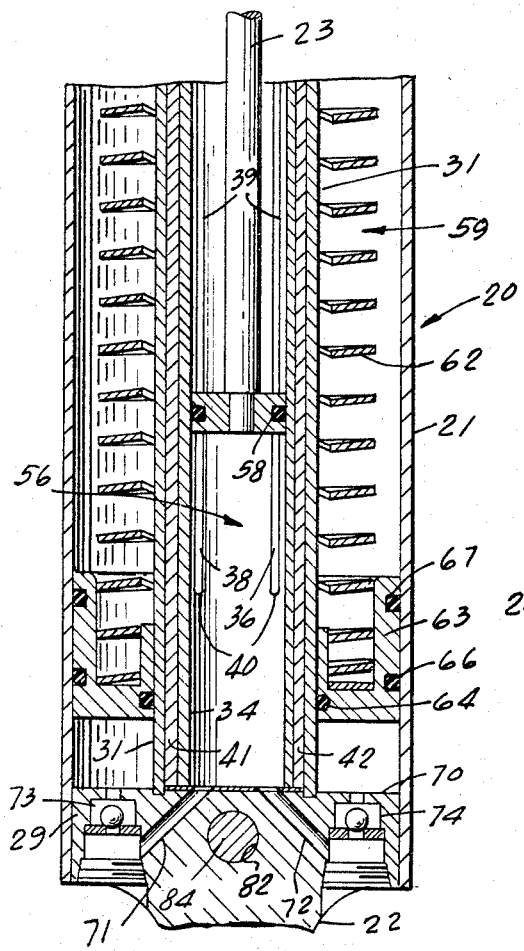
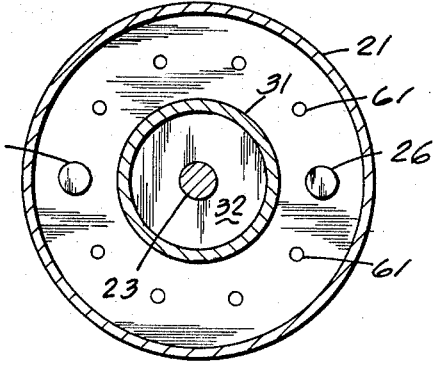
INVENTOR.
ROBERT A. STUBBLEFIELD
BY
ATTORNEYS May 7, 1968  R. A. STUBBLEFIELD  3,381,952
LOAD-LEVELING SHOCK ABSORBER
Filed Oct. 23, 1965  4 Sheets-Sheet 3
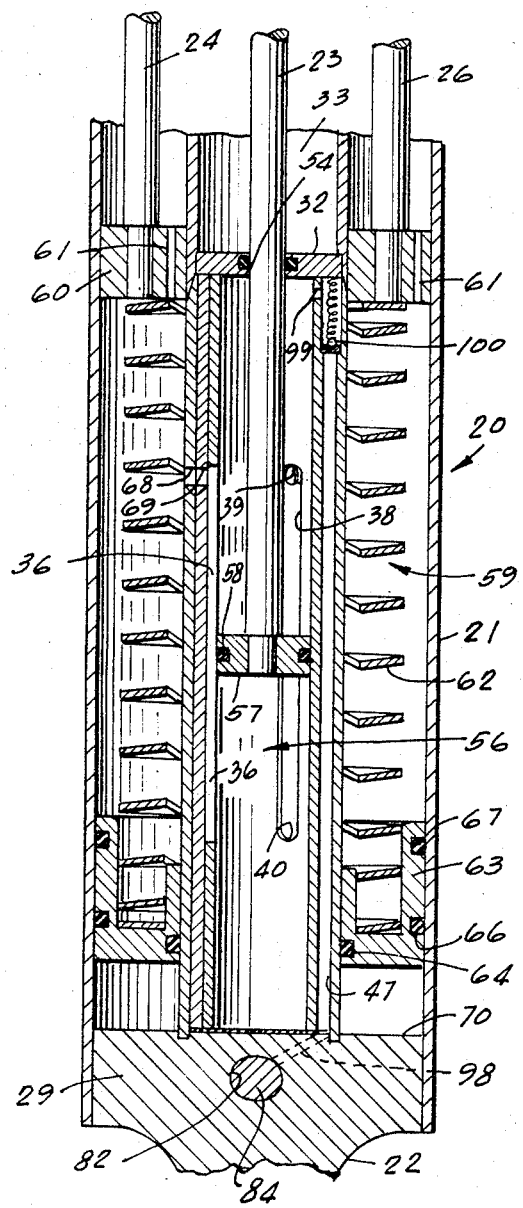
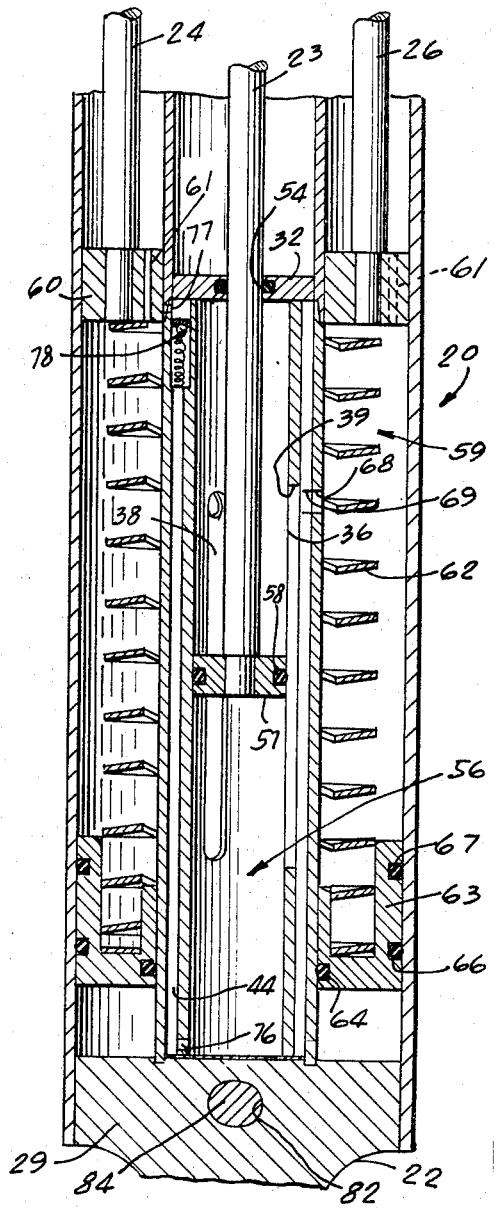
INVENTOR.
ROBERT A. STUBBLEFIELD
BY  ATTORNEYS May 7, 1968  R. A. STUBBLEFIELD  3,381,952
LOAD-LEVELING SHOCK ABSORBER
Filed Oct. 23, 1965  4 Sheets-Sheet 4
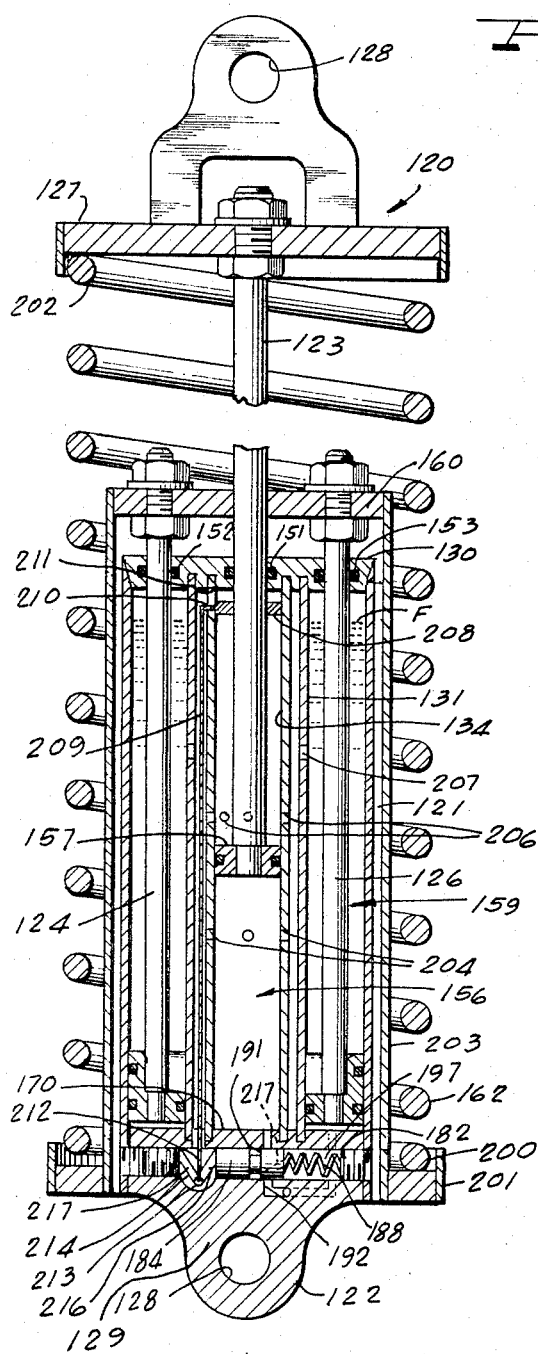
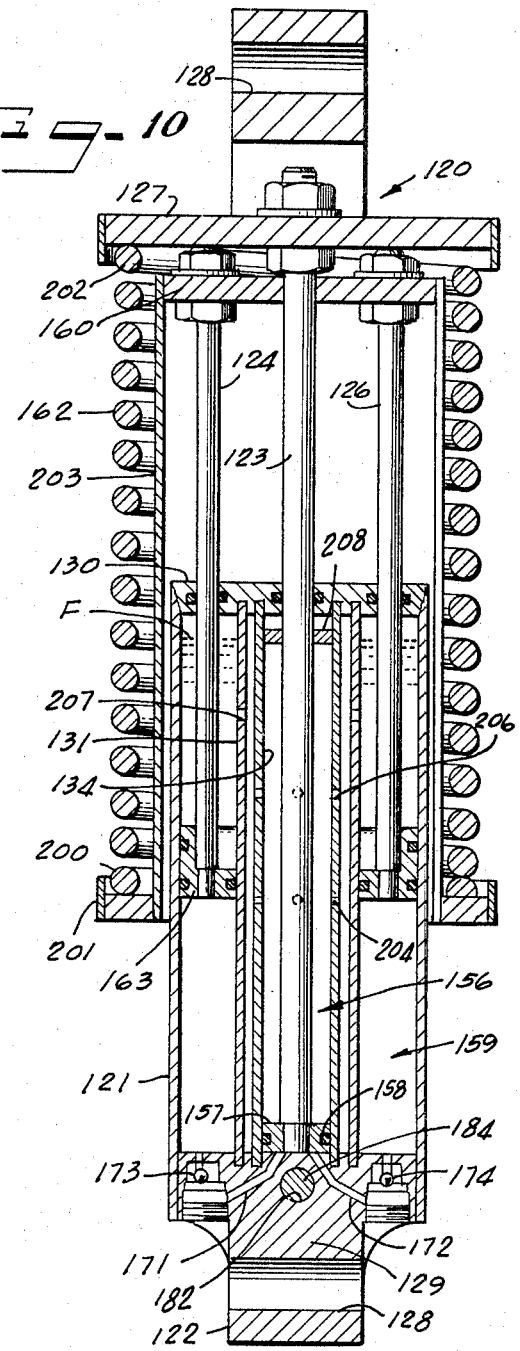
INVENTOR.
ROBERT A. STUBBLEFIELD
BY *Hill, Sherman, Meroni, Gross & Simpson* ATTORNEYS United States Patent Office 3,381,952
Patented May 7, 1968

3,381,952
LOAD-LEVELING SHOCK ABSORBER
Robert A. Stubblefield, 219 F St.,
Salt Lake City, Utah 84103
Filed Oct. 23, 1965, Ser. No. 503,036
7 Claims. (Cl. 267—34)

ABSTRACT OF THE DISCLOSURE

A load-leveling shock absorber unit including a first piston and cylinder, one of which is connected to a sprung mass and the other of which is connected to an unsprung mass, and a second piston and cylinder, the piston of which is connected to one of the masses through a spring and the cylinder of which is connected directly to the other of the masses. The cylinders are concentrically arranged and are of the hydraulic type. The first piston reciprocates within the first cylinder in accordance with undulations in a road surface or the like. If the first piston is located within a mid-portion of the first cylinder such reciprocatory movement has no effect on the second piston. However if such reciprocation of the first piston occurs at either of the opposite end portions of the first cylinder it has the effect of pumping fluid into or out of the second cylinder below the second piston to raise or lower the second piston in the second cylinder and thus raise or lower the sprung mass relative to the unsprung mass.

This invention relates generally to vehicular shock absorber units and more particularly to an absorber unit which compensates itself for variations in vehicular loading to maintain a given level of the sprung mass of the vehicle.

An object of this invention is to provide a load-leveling shock absorber unit which is dependable in operation over extensive periods of use. Known devices of this type are generally complicated and therefore susceptible to many mechanical difficulties, with the expense in repair and replacement attendant thereto. Furthermore, when replacement is necessary the period of down time of the vehicle can be inconvenient and result in additional expense or loss. By contrast, the present invention is embodied in a device which is simple in design and construction and includes a minimal number of moving and closely machined parts.

Another object of the invention is to provide a load-leveling absorber unit which is relatively inexpensive in manufacture. Many vehicular accessories and improvements achieve little or no commercial success regardless of improved comfort, safety, performance, etc., derivable therefrom simply because the increased cost is prohibitive. Thus in the automotive field manufacturers are apparently reluctant to include load-levers as standard equipment on all models because of the relatively substantial costs involved. The cost of manufacture of the load lever of the present invention, however, has been appreciably reduced in order to make available the advantages of load levers to many more users of automotive vehicles.

Still another object of the present invention is to eliminate the requirement of an external power source, and also to eliminate the necessity for gas pressure chambers, sundry diaphragms, bladders and the like found in some load levelers.

The shock absorber unit of this invention can be utilized either alone or in combination with the shock absorbers of a conventional suspension system, since the upper frame of the vehicle is not merely maintained at a given level but is also supported by the shock absorber unit.

Basically, the present invention comprises a first piston and cylinder, one of which is connected to the sprung mass and the other of which is connected to the unsprung mass, and a second piston and cylinder, the piston being connected to one of the masses through a spring and the cylinder being connected to the other of the masses.

The invention is hydraulically operated, and the two cylinders are in fluid communication with one another. When the vehicle is loaded with an average weight the first piston is situated in the central portion of the first cylinder and undulations in the road surface as the vehicle moves thereacross have the effect of causing the first piston to reciprocate back and forth within the central portion of the first cylinder with no effect on the second piston.

When an extra load is added to the vehicle the first piston moves down into the lower portion of the first cylinder. Reciprocal movement of the first piston within the lower portion of the first cylinder, caused by an uneven road surface, has the effect of pumping hydraulic fluid from the first cylinder into the second cylinder, thereby raising the second piston and the spring, and thus the sprung mass of the vehicle. Such raising continues until the sprung mass has been raised sufficiently so that the first piston again resides within the central portion of the first cylinder, whereupon further reciprocation of the first piston has no further effect in raising the sprung mass.

If the load is subsequently reduced to below an average, the first piston is urged upwardly by the spring into the upper portion of the first cylinder. Reciprocal movement of the first piston in that position thereof has the effect of withdrawing the fluid from the second cylinder, thereby lowering the second piston and the spring and, as a result, the sprung mass of the vehicle. Lowering of the sprung mass has the effect of lowering the position of the first piston in the first cylinder until it again resides within the central portion of the first cylinder. Subsequent reciprocal movement of the first piston when it is within the central portion of the first cylinder has no further effect in lowering the sprung mass.

The flow of fluid between the two cylinders is controlled by various valving arrangements that are actuated by the movement of the first piston. The device is completely self-contained and requires no external power source for actuation of the piston or valve structures.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the drawings:

FIGURE 1 is an elevational view of an exemplary embodiment of a load-leveling shock absorber unit constructed in accordance with the principles of the present invention;

FIGURE 2 is a vertical sectional view of the absorber unit of FIGURE 1 taken through a plane intersecting the longitudinal axis of the unit;

FIGURE 3 is a fragmentary vertical sectional view similar to FIGURE 2 but taken through a plane offset angularly with respect to the plane of FIGURE 2;

FIGURES 4 and 5 are also similar to FIGURE 2 but taken through other planes offset with respect to the planes of FIGURES 2 and 3;

FIGURE 6 is a horizontal sectional view taken along lines VI—VI of FIGURE 2;

FIGURE 7 is a horizontal sectional view taken along lines VII—VII of FIGURE 2;

FIGURE 8 is an enlarged fragmentary sectional view emphasizing an exemplary valve arrangement of the invention;

FIGURE 9 is a vertical sectional view of another embodiment of the invention taken through a plane intersecting the longitudinal axis of the unit; and FIGURE 10 is a vertical sectional view similar to FIGURE 9 but taken through a plane offset with respect to the plane of FIGURE 9.

As shown on the drawings:

In FIGURE 1 reference character 20 indicates generally a load-leveling shock absorber unit constructed in accordance with the principles of the present invention and comprising an outer cylindrical casing 21 having formed thereon at one end thereof a connector flange 22. A plurality of piston rods 23, 24 and 26 project upwardly from the casing 21 and are joined in fixed assembly at the top thereof by means of a companion connector flange 27. The connector flanges 22 and 27 are adapted for connection to the sprung and unsprung masses of a vehicle and are apertured as at 28 for that purpose.

As shown in FIGURE 2 the outer casing 21 is closed at the lower end thereof by a base plate 29 and at the top end thereof by an end cap 30. A concentric cylinder wall 31 which has a diameter substantially less than the diameter of the casing 21 interconnects the base plate 29 and the end cap 30 in fixed assembly.

A transverse plug or insert 32 is securely mounted within the cylinder wall 31 downwardly from the end cap 30 to partition the cylinder 33 formed by the cylindrical wall 31 into two separated portions.

Another concentric cylinder wall 34 having a diameter which is slightly less than the diameter of the cylinder wall 31 extends from the plug 32 to the base plate 29 whereby a tubularly shaped space is provided between cylinder walls 31 and 34. A plurality of axially extending grooves 36, 37 and 38 are formed in the cylinder wall 34 and terminate respectively at an upper end 39 situated below the end cap 30, and at a lower end 40 situated above the base plate 29. A plurality of axially extending tubularly shaped circumferentially spaced sleeve members 41, 42 and 43 are housed in the space between cylindrical walls 31 and 34 to provide a plurality of axially extending fluid passages 44, 46 and 47.

The piston rods 23, 24 and 26 extend through bores 48, 49 and 50 formed in the end cap 30 and are surrounded by sealing members 51–53 to protect leakage of fluid past the end cap 30. The center piston rod 23 also extends through a bore 54 formed in the plug 32 and has mounted at the lower end thereof within a cylinder 56 formed by the cylinder wall 34 a piston 57 carrying a circumferential sealing ring 58. The other two piston rods 24 and 26 have mounted thereon at the lower ends thereof in the annular space between the casing 21 and the cylinder wall 31, said annular space being referred to hereinafter as a cylinder 59, an annular ring 60 having a plurality of passages as at 61 formed therein and extending axially therethrough.

Situated underneath and supporting the ring 60 is a heavy helical coil spring 62 which is wound within the cylinder 59 and which is, in turn, supported by a piston member 63 situated at the lower end portion of the cylinder 59. In order to prevent leakage of fluid pass the piston 63 a plurality of sealing members such as O-rings 64, 66 and 67 are mounted thereon in sealing contact with both the inside surface of the casing 21 and the outside surface of the cylinder wall 31.

Before the absorber unit 20 is completely assembled the cylinder 59 is substantially filled with fluid such as oil to a level indicated at F. As a result of the passages 61 formed in the ring 60 the fluid fills the cylinder 59 below the ring 60, and as a result of a plurality of registered bores 68 and 69 formed respectively in the cylinder wall 31 and the sleeves 41–43 at the upper ends 39 of the grooves 36–38, the cylinder 56 is also filled with fluid both above and below the piston 57. The cylinder 59 has no fluid in it below the piston 63 at this point in time, and as a result piston 63 is bottomed on an inner wall 70 of the base plate 29.

The "$k$" factor of the spring 62 is such that when a plurality of absorber units 20 are mounted on a vehicle having an average load thereon between the sprung and the unsprung masses, either by themselves or in combination with conventional absorber devices, the ring 60 is maintained by the spring 62 in spaced relation to the piston 63, which is bottomed on the base plate 29, such that the piston 57 resides within the central portion of the cylinder 56, that is, that portion of the cylinder 56 which extends axially between the ends 39 and 40 of the grooves 36–38. When the vehicle is in motion irregularities in the road surface causes the piston rod 23, 24 and 26 and the piston 57 and the ring 60 to oscillate or reciprocate within cylinders 56 and 59. This oscillatory movement of piston 57 within the central portion of the cylinder 56 has no pumping effect on the fluid within cylinder 56 since the fluid is merely moved back and forth from one side of the piston 57 to the other side through the grooves 36–38.

Assume, however, that an extra load is applied to the sprung mass of the vehicle. In such event the spring 62 is compressed accordingly, which results in the movement of ring 60 downwardly. Piston 57 also moves downwardly such that it then resides within a lower portion of cylinder 56, that is, that portion thereof which extends axially from the bottoms 40 of the grooves 36–38 to the top wall 70 of the base plate 29.

Oscillations of the piston 57 when it is within this lower portion of the cylinder 56 does have a pumping effect on the fluid to raise the unsprung mass. Referring to FIGURE 3, as the piston 57 moves downwardly, the fluid in cylinder 56 below the piston 57, in an amount proportionate to the travel of the piston 57, is forced through a pair of passages 71 and 72 formed in the base plate 29 which communicate the lower end of cylinder 56 with the lower end of cylinder 59 through a pair of check valves 73 and 74 which open into cylinder 59 through the inner wall 70 of the base plate 29. The piston 63 is raised accordingly, thereby raising slightly the spring 62, the ring 60 which it supports, the sprung mass of the vehicle and, in addition, the piston 57 in cylinder 56. During a subsequent upward movement of the piston 57 (still while within the lower portion of the cylinder 56) fluid is supplied to cylinder 56 below the piston 57 from cylinder 59, but from a point above the piston 63. Referring now to FIGURE 5, it will be noted that a small aperture 76 is formed in the cylinder wall 34 adjacent the base plate 29, which aperture 76 communicates the lower portion of cylinder 56 with passage 44. At the upper end of passage 44 an aperture 77 is formed in the cylinder wall 31, thereby communicating passage 44 with the cylinder 59. A check valve 78 is mounted within the passage 44 to enable fluid to flow from cylinder 59 through passage 44 to the lower portion of cylinder 56 as piston 57 moves upwardly in cylinder 56 within the lower portion thereof.

Thus it will be noted that when piston 57 is situated within the lower portion of cylinder 56, for each downward motion of the piston 57, piston 63 is raised slightly to raise the sprung mass of the vehicle as well as to raise the position of piston 57 within cylinder 56. As piston 57 moves upwardly fluid fills the void below it as it is drawn through aperture 76 from the passage 44 and the cylinder 59.

The piston 57 will ultimately rise to again reside within the central portion of cylinder 56 and further undulations in the road surface will have no effect in raising or lowering the sprung mass of the vehicle.

Assume now that the extra load is removed from the vehicle. The spring 62 expands to urge the ring 60 upwardly, thereby moving the piston 57 into the upper portion of the cylinder 56, that is, that portion thereof between the upper ends 39 of grooves 36–38 and the plug 32.

Irregularities in the surface of the road will cause the piston 57 to oscillate in the upper portion of the cylinder 56. An upward movement of the piston 57 has the effect of pumping fluid from the top of the piston 57 through an aperture 79 formed in the cylinder wall 34 adjacent the plug 32, and downwardly through passage 46 past a check valve 80 mounted within passage 46.

As is shown in FIGURE 2, a bore 81 is formed in the base plate 29 in register with the passage 46 and communicates with a cylindrical bore 82 also formed in the base plate 29 and extending transversely to the longitudinal axis of the unit 20.

The cylinder 82 houses a foot valve indicated generally at reference numeral 83 which comprises a valve member 84 urged toward an end wall 87 of the cylinder 82 by means of a spring 88. The valve member 84 is tapered slightly at one end 89 thereof but an opposite end 90 thereof is cylindrical and has a diameter slightly less than the diameter of the cylinder 82.

As the fluid is pumped downwardly through passage 46 and the bore 81 into the cylinder 82, the valve member 84 is urged rightwardly as viewed in FIGURE 2 until an annular circumferential groove 91 formed in the peripheral surface of end 90 of the valve member 84 is aligned with a complemental annular groove 92 formed in the base plate 29 and communicating with a passage 93 opening to the cylinder 56 through the wall 70 of the base plate 29.

When grooves 91 and 92 are aligned a fluid flow path is opened between cylinder 59 below piston 63 and the lower portion of 56 through a pair of passages 93 and 94 (FIGURES 2 and 3) which communicate cylinder 59 with the groove 92. As a result some of the fluid in cylinder 59 below the piston 63 flows into the cylinder 56, thereby lowering the piston 63 and, correspondingly, the spring 62, the ring 60, the sprung mass of the vehicle and the piston 57 in cylinder 56. Some of the fluid which enters cylinder 82 through the passage 46 and the bore 81 enters the cylinder 56 through another bore 96 formed in the base plate 29, and the remainder of the fluid enters cylinder 56 by leaking past the valve member and into the groove 92 to pass through the bore 93 into the cylinder 56.

As the piston 57 moves downwardly in the upper portion of cylinder 56 the excess fluid in cylinder 56 below piston 57 can escape through ports 68 and 69 into the cylinder 59. The void above piston 57, however, is supplied with fluid through the longitudinal passage 47 which is in communication with a portion 97 of the cylinder 82 which houses the spring 88 through a passageway 98 (FIGURES 2, 4 and 6) formed in the base plate 29. The upper end of passage 47 (FIGURE 4) is in communication with the upper end of cylinder 56 through an aperture 99 formed in the cylinder wall 34. A check valve 100 is housed within passage 47 to preclude reverse flow of the fluid therethrough.

Accordingly, each oscillation of the piston 57 when it is situated within the upper region or portion of the cylinder 56 has the effect of withdrawing fluid from the cylinder 59 below piston 63 into the cylinder 56 below piston 57. The piston 63 moves incrementally toward the wall 70 of the base plate 29, thereby lowering the spring 62, the ring 60 and the sprung mass of the vehicle until the piston 57 again resides within the central portion of the cylinder 56.

Another embodiment of the invention is shown in FIGURES 9 and 10, wherein parts similar in function to those shown in FIGURES 1–8 are given the same reference numerals raised by 100. In this embodiment the spring 162 is not supported directly by the piston 163, but instead is bottomed as at 200 on an annular bracket 201 which surrounds the casing 121 in radially spaced relation. A top end 202 of the spring 162 directly supports the connector member 127 and thus the sprung mass of the vehicle.

Rods 124 and 126 are fixedly connected at opposite ends to the piston 163 and the ring 160, and the ring 160 in turn is connected in fixed assembly to the annular bracket 201 by means of an external tubular sleeve 203 which telescopes over the casing 121.

Unlike the embodiment illustrated in FIGURES 1–8, there are no sleeve members between the outer cylinder wall 131 and the inner cylinder wall 134. A series of circumferentially spaced apertures are formed in the cylinder wall 134 for communicating the cylinder 156 with the space between cylinder walls 131 and 134. Another series of apertures 206 are formed in cylinder wall 134 in axially spaced relation to apertures 204 and the longitudinal extent of cylinder 156 between apertures 204 and apertures 206 constitutes the central portion of cylinder 156, that portion thereof between apertures 204 and wall 170 of the base plate 129 constituting the lower portion of the cylinder, and that portion between apertures 206 and the end cap 130 constituting the upper portion of cylinder 156.

In addition a plurality of circumferentially spaced apertures 207 are formed in the cylinder wall 131 in order to communicate the space between cylinder walls 131 and 134 with the cylinder 159.

When the absorber unit 120 is subjected to an average load, the piston 157 resides within the central portion of cylinder 156. When an extra load is applied the piston 157 will move downwardly as viewed in FIGURE 10 to the lower portion of cylinder 156, thereby pumping fluid from the lower portion of cylinder 156 through passages 171 and 172 formed in the base plate 129 into the cylinder 159 below the piston 163. This raises the piston 163 which in turn raises the annular bracket 201, the spring 162 and also the unsprung mass of the vehicle. Subsequent oscillations of the piston 157 while it is within the lower portion of cylinder 156 will have the effect of continuing to raise the unsprung mass of the vehicle until the piston 157 resides again within the central portion of cylinder 156, whereupon oscillations of piston 157 will have no further effect upon the raising of the vehicle.

It should be noted that when the piston 157 is situated within the lower portion of cylinder 156 and is rising within that cylinder, the void below piston 157 is filled by leakage past the piston rather than by a passage similar to passage 44 in the embodiment of FIGURES 1–8. Such arrangement has the salutary effect of somewhat dampening the oscillations of the piston 157, which may be desirable in certain applications of the absorber unit 120.

When the extra load is removed from the unit 120, the piston 157 tends to rise above apertures 207 into the upper portion of cylinder 156. This has the effect of moving a washer or disc slidably carried in cylinder 156 in surrounding relation to the rod 123 upwardly toward the end cap 130. As best seen in FIGURE 9, the washer 208 is fixedly connected to a wire-like rod 209 which extends axially in the space between cylinder walls 131 and 134 down into the base plate 129. An inturned upper end 210 of the rod 209 extends through an aperture 211 formed in the upper end of cylinder wall 134, and the washer or disc 208 normally covers or closes the aperture 211.

A lower end 212 of the rod 209 is connected to a pin 213 which pivotally connects a pair of linkage members 214 and 216. As rod 209 is moved upwardly by the disc 208 when the piston 157 moves upwardly in the upper end portion of cylinder 156, thereby pressurizing the fluid to move the washer 208 upwardly, it has the effect of opening up or increasing the angle between the linkage member 214, an upwardly sloping end 217 of which abuts a plug 218 in the cylinder 182, and the linkage member 216, an upwardly sloping end of which abuts the valve member 184 in the cylinder 182.

As a result, the valve member 184 is mechanically (as opposed to hydraulically) moved rightwardly as viewed in FIGURE 9 whereupon the circumferential groove 191 thereof is brought into alignment with the groove 192 formed in the base plate 129 to communicate cylinder 159 below piston 163 with cylinder 156 below piston 157 through a passage 193.

It will thus be appreciated that upward movement of piston 157 in the upper portion of cylinder 156 has the effect of withdrawing fluid from cylinder 159 and discharging it into cylinder 156 whereupon the unsprung mass of the vehicle is incrementally lowered. When the piston 157 moves downwardly in the upper portion of cylinder 156, once again the void above the piston 157 is filled, in the embodiment of FIGURES 9 and 10, by leakage of the fluid past the piston 157.

In both of the illustrated embodiments of the invention, that is, the embodiment illustrated in FIGURES 1–8 and the other embodiment illustrated in FIGURES 9 and 10, a narrow diameter passageway 217 is formed in the valve member (84, 184) and communicates the circumferential groove (91, 191) formed in the valve member with that portion of the cylinder (82, 182) in which the spring (88, 188) is housed. The purpose of passageway 217 is to enable the fluid in the cylinder (82, 182) behind the valve member (84, 184) to escape when the valve member is urged rightwardly as viewed, for example, in FIGURES 2 and 9. In addition fluid can move back into this portion of the cylinder when the valve member is urged leftwardly by the spring (88, 188). While the invention is operative without the passageway 217 in the valve member (84, 184) the invention is not as quick to respond in maintaining a given level of the vehicle upon variations in loading, since then the fluid must leak past the valve member (84, 184) to and from that portion (97, 197) of the cylinder (82, 182) in which the spring (88, 188) is housed.

Although minor modifications might be suggested by those versed in the art, it should be understood that I wish to embody within the scope of the patent warranted hereon all such modifications as reasonably come within the scope of my contribution to the art.

I claim as my invention:

1. A self-leveling shock absorber unit for vehicles having a sprung mass and an unsprung mass comprising,
    a first hydraulic cylinder and a first piston slidably carried therewithin,
        said first cylinder and said first piston being adapted for connection respectively to different ones of the vehicle masses,
    a second hydraulic cylinder and a second piston slidably carried therewithin,
        said second cylinder being adapted for connection to one of the vehicle masses,
    an elongated spring member bottomed at one end thereof on said second piston and adapted for connection at the opposite end thereof to the other of the vehicle masses,
    first fluid passage means including valve means communicating said first cylinder with said second cylinder whereby reciprocal movement of said first piston within one end portion of said first cylinder causes fluid to be pumped from said first cylinder to said second cylinder to move said second piston in one direction and reciprocal movement of said first piston within an opposite end portion of said first cylinder causes fluid to be returned from said second cylinder to said first cylinder to move said second piston in an opposite direction, and
    second fluid passage means communicating both sides of said first piston when said first piston is within a central portion of said first cylinder between said end portions thereof whereby reciprocal movement of said first piston within the central portion of said first cylinder has no effect on movement of said second piston.

2. A self-leveling shock absorber unit for vehicles having a sprung mass and an unsprung mass comprising,
    a first hydraulic cylinder and a first piston slidably carried therewithin,
        said first cylinder and said first piston being adapted for connection respectively to different ones of the vehicle masses,
    a second hydraulic cylinder and a second piston slidably carried therewithin,
        said second cylinder and said second piston being adapted for connection respectively to different ones of the vehicle masses,
    first fluid passage means including valve means communicating said first cylinder with said second cylinder whereby movement of said first piston in one direction within one end portion of said first cylinder causes fluid to be pumped from said first cylinder to said second cylinder to move said second piston in an opposite direction and movement of said first piston in said opposite direction within an opposite end portion of said first cylinder causes fluid to be returned from said second cylinder to said first cylinder to move said second piston in said one direction, and
    second fluid passage means communicating both sides of said first piston when said first piston is within a central portion of said first cylinder between said end portions thereof whereby movement of said first piston within the cental portion of said first cylinder has no effect on movement of said second piston.

3. A self-leveling shock absorber unit for vehicles having a sprung mass and an unsprung mass comprising,
    a first hydraulic cylinder closed at both ends thereof,
    a first piston carried within said first cylinder and having a rod extending therefrom and out of one of said closed ends of said first cylinder,
        said first piston being slidable from a first end portion of said first cylinder adjacent said one of said closed ends to a central portion of the first cylinder to a second end portion opposite said one of said closed ends,
        said first piston being adapted for connection to one of the masses of the vehicle and said first cylinder being adapted for connection to the other of said masses,
    a second hydraulic cylinder having means thereon for connection to one of the masses of the vehicle, a second piston slidably carried within said second cylinder,
    a helical spring bottomed at one end thereof on said second piston,
        the other end of said spring and said second cylinder being adapted for connection respectively to different ones of the masses of the vehicle,
    first fluid passage means including first valve means for pumping fluid from said second end portion of said first cylinder into said second cylinder when said first piston moves reciprocally within said second end portion of said first cylinder to move said second piston in one direction within said second cylinder,
    second fluid passage means including second valve means for removing fluid from said second cylinder back into said first cylinder when said first piston moves reciprocally within said first end portion of said first cylinder whereby said second piston is moved in an opposite direction within said second cylinder, and
    third fluid passage means communicating both sides of said first piston within said first cylinder when said first piston moves reciprocally within said central portion of said first cylinder whereby fluid is neither pumped into nor removed from said second cylinder.

4. A self-contained load leveling shock absorber for a vehicle having a sprung mass and an unsprung mass comprising,
    a first hydraulic cylinder having a central portion and end portions on both sides of said central portion and closed at both ends thereof,
    a first piston slidably carried within said first cylinder and having a rod connected thereto extending out of one of said closed ends,
  said first cylinder being adapted for connection to one of the vehicle masses and said rod being adapted for connection to the other of the masses,
means communicating one side of said first piston with the other side thereof when said piston is within the central portion of said first cylinder, a second hydraulic cylinder surrounding said first cylinder and closed at both ends thereof, a second piston slidably carried within said second cylinder,
  said second cylinder being adapted for connection to said one of said masses and said rod being adapted for connection to said other of said masses,
first and second independent fluid passage means communicating one end portion of said first cylinder with the corresponding end portion of said second cylinder,
a check valve in said first fluid passage preventing fluid flow through said first passage from said second to said first cylinder,
a valve assembly in said second fluid passage having a valve member movable from a first position closing said second passage,
biasing means biasing said valve member to said first position thereof, and
means operative to move said valve member to said second position thereof when said first piston moves from said central portion of said first cylinder into said other end portion of said first cylinder.

5. The shock absorber as defined in claim 4 wherein said operative means comprises a third fluid passage communicating said other end portion of said first cylinder with said valve member for moving said valve member to said second position thereof by fluid pressure.

6. The shock absorber as defined in claim 4 wherein said operative means comprises an operating rod operatively connected to said valve member and movable from a first position when said valve member is in said first position thereof to a second position for moving said valve member to said second position thereof, and
  means responsive to fluid pressure in said other end portion of said first cylinder for moving said operating rod between said first and second positions thereof.

7. A self-contained load leveling shock absorber for a vehicle having a sprung mass and an unsprung mass comprising,
  a first hydraulic cylinder having a central portion and end portions on both sides of said central portion and closed at both ends thereof, a first piston slidably carried within said first cylinder and having a rod connected thereto extending out of one of said closed ends,
    said first cylinder being adapted for connection to one of the vehicle masses and said rod being adapted for connection to the other of the masses,
  means continuously communicating one side of said first piston with the other side thereof when said first piston is within the central portion of said first cylinder,
  a second hydraulic cylinder surrounding said first cylinder and closed at both ends thereof, a second piston slidably carried within said second cylinder,
    said second cylinder being adapted for connection to said one of the vehicle masses,
  a helical spring extending concentrically with said cylinders and bottomed at one end thereof on said second piston and adapted for connection at the other end thereof to said other of the vehicle masses,
  first and second independent fluid passage means communicating one end portion of said first cylinder with the corresponding end portion of said second cylinder,
  a check valve in said first fluid passage preventing fluid flow through said first passage from said second to said first cylinder,
  a valve assembly in said second fluid passage having a valve member movable from a first position closing said second passage to a second position opening said second passage,
  biasing means biasing said valve member to said first position thereof, and
  means operative to open said second fluid passage when said first piston moves from said central portion of said first cylinder into said other end portion of said first cylinder.

References Cited
UNITED STATES PATENTS 3,326,546   6/1967   Otto _____ 267—64

ARTHUR L. LA POINT, *Primary Examiner.*

R. M. WOHLFARTH, *Assistant Examiner.*